United States Patent [19]

Miura et al.

[11] Patent Number: 4,740,699
[45] Date of Patent: Apr. 26, 1988

[54] RADIOGRAPHIC IMAGE READING METHOD

[75] Inventors: Mikio Miura; Hisanori Tsuchino; Makoto Kumagai; Fumio Shimada, all of Hino, Japan

[73] Assignee: Konishiroku Photo Industry Co., Ltd., Tokyo, Japan

[21] Appl. No.: 913,624

[22] Filed: Sep. 30, 1986

Related U.S. Application Data

[63] Continuation of Ser. No. 737,893, May 23, 1985, which is a continuation-in-part of Ser. No. 682,770, Dec. 18, 1984, abandoned.

[30] Foreign Application Priority Data

Dec. 23, 1983 [JP] Japan .................... 58-251419

[51] Int. Cl.$^4$ ................................. G03C 5/16
[52] U.S. Cl. .................. 250/327.2; 250/484.1
[58] Field of Search ...................... 250/484.1, 327.2

[56] References Cited

U.S. PATENT DOCUMENTS

| | | | |
|---|---|---|---|
| 4,350,893 | 9/1982 | Takahashi et al. | 250/337 |
| 4,507,379 | 3/1985 | Tsuchino et al. | 250/327.2 |
| 4,527,060 | 7/1985 | Suzuki et al. | 250/484.1 |
| 4,564,760 | 1/1986 | Noguchi et al. | 250/327.2 |

Primary Examiner—Carolyn E. Fields
Attorney, Agent, or Firm—Jordan B. Bierman

[57] ABSTRACT

A method of reading out a radiographic image by storing radiation energy corresponding to a radiographic image on a stimulative phosphor layer on a panel, scanning the layer with a semi-conductor laser to release the energy as fluorescence, and detecting the fluorescence to form an image, wherein wavelengths having an intensity lower than an excitation wavelength intensity of said laser are removed by optical means before scanning the layer.

7 Claims, 3 Drawing Sheets

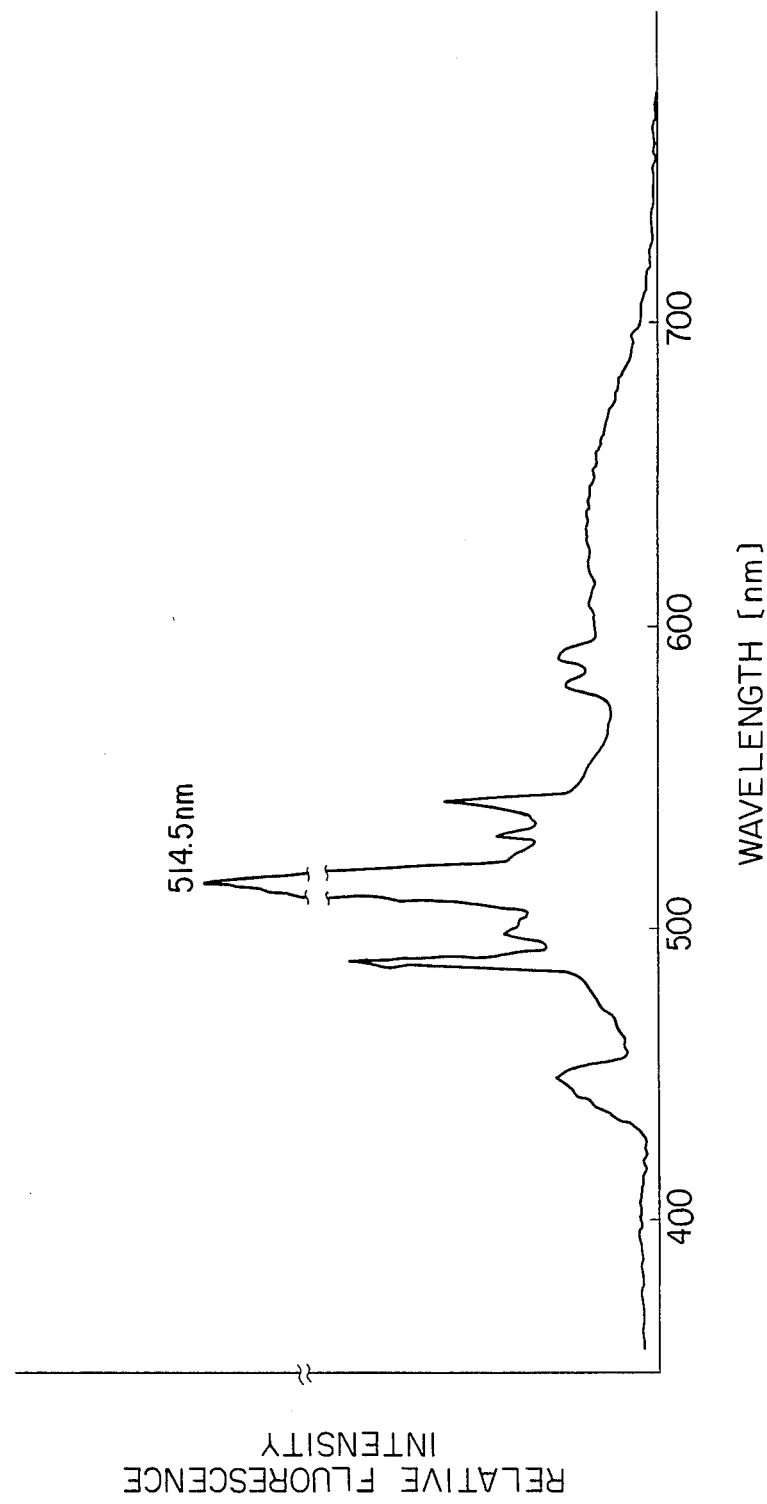

FIG. 3
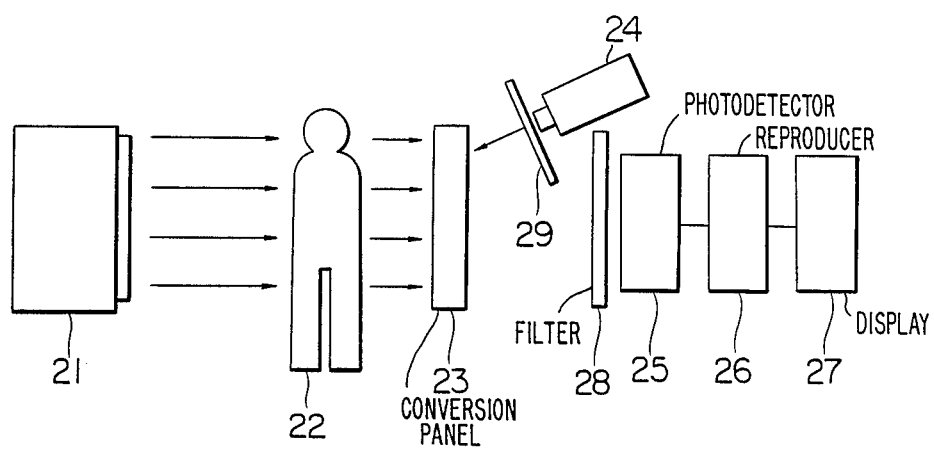
FIG. 4(a)   FIG. 4(b)
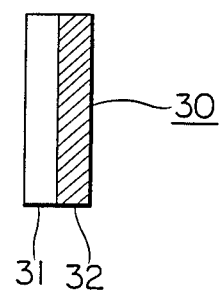 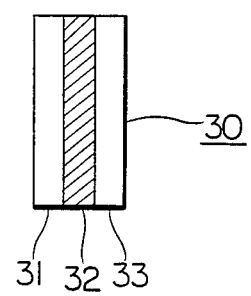

RADIOGRAPHIC IMAGE READING METHOD

This application is a continuation of application Ser. No. 737,893, filed May 23, 1985 which is a continuation-in-part of Ser. No. 682,770, filed Dec. 18, 1984, both abandoned.

BACKGROUND OF THE INVENTION

1. Field of the Invention

This invention relates to a radiographic image reading method that is applicable to a radiographic imaging system. More particularly, this invention relates to an optical means of eliminating impediment rays, which is used for reading a radiographic image in the radiographic imaging system in which a radiographic image is recorded on a stimulative phosphor material and is then reproduced by irradiating it with stimulative excitation rays.

2. Description of the Prior Art

A radiographic image such as an X-ray image is popularly used for diagnosing diseases. To obtain such X-ray images, there utilize the so-called radiographs which are produced in the manner that a phosphor layer such as an intensifying screen is irradiated with X-rays which have penetrated a subject so as to produce visible rays, and a silver salt-containing film is exposed to the visible rays and is then developed in a process similar to those taken in the ordinary photography.

In recent years, however, there have been devised the methods of obtaining images directly from a phosphor layer without using any films coated thereon with a silver salt.

These methods include a method in which radiation rays which have penetrated a subject are absorbed in a phosphor material so as to store radiant energy therein, and then the radiant energy is radiated in the form of fluorescence by exciting it with the energy of light or heat for example, and an image is formed by detecting the radiated fluorescence. U.S. Pat. No. 3,859,527 and Japanese Patent Publication Open to Public Inspection (hereinafter referred to as Japanese Patent O.P.I. Publication) No. 12144/1980, for example, disclose a radiographic image conversion method in which a stimulative phosphor material is used, and visible or infrared rays of light are served as stimulative excitation rays. This method uses a radiographic image conversion panel comprising a support bearing thereon a stimulative phosphor material layer. In this method, an image is obtained in such a manner that the stimulative phosphor material layer of this radiographic image conversion panel is irradiated with radiation rays which have penetrated a subject and it stores therein the radiant energy corresponding to the penetration degree of the radiation rays so penetrated each region of the subject as to form a latent image, and then each of the regions of the stimulative phosphor material layer is applied with the stored radiant energy latent-imagewise by scanning over the layer with stimulative excitation rays and the radiant energy is converted into rays of light, and the image is formed according to the optical signals generated by the various intensity of the converted rays of light. From this finished image, a hard-copy or an image on a CRT may further be reproduced.

In order to obtain a noiseless and sharp radiographic image in such a radiographic imaging system, it is required to efficiently separate the above-mentioned stimulative excitation rays and stimulative luminescence from each other, and it is, in addition, required to separate them from each other without losing the stimulative luminescence as far as possible, because an S/N ratio is extremely lowered when the stimulative excitation rays strike on a photodetector.

The above-mentioned methods include, for example, such a method of separating stimulative excitation rays and a stimulative luminescence from each other by means of a filter, as proposed in Japanese Patent O.P.I. Publication Nos. 12142/1980, 12144/1980, 12145/1980 and the like.

Every effort to improve the above-mentioned S/N ratio was not yet rewarded with satisfactory result.

SUMMARY OF THE INVENTION

It is an object of the invention to provide a method of noiselessly and correctly reading an image when the image is obtained from a radiographic image recorded or a radiographic image conversion panel with the use of laser beams especially semiconductor laser beams, serving as stimulative excitation rays.

The above-mentioned object of the invention can be attained in a method of reading a radiographic image in which a radiographic image conversion panel having a stimulative phosphor material layer thereon is scanned with stimulative excitation rays, and stimulative luminescence emitted from every point of the panel is detected by a photodetector, and the method is characterized in that laser beams are used as the above-mentioned stimulative excitation rays and wavelengths other than the emission wavelengths of the laser beams are eliminated by an optical means before scanning said stimulative layer.

According to the method of reading a radiographic image, an image having a S/N ratio superior to those of the conventional type of images can be read by eliminating miscellaneous rays having a lower wavelength intensity than the excitation wavelength intensity of excitation laser beams irradiating a stimulative phosphor material, and a further progress is resulted in a radiographic image conversion system by preventing the defects still remaining unnoticed in the prior art.

BRIEF DESCRIPTION OF THE DRAWINGS

FIG. 1 is a graph showing the emission spectrum of an Ar+ laser beam usable for a stimulative excitation ray, in which the axis of ordinates expresses the relative fluorescence intensity thereof and the axis of abscissas expresses the wavelength thereof, and, besides the emission wavelength of the laser beam, many other peaks of wavelength are shown, FIG. 3 is a diagram illustrating an example of the radiographic imaging systems capable of applying to a method of the invention, and FIGS. 4(a) and 4(b) show the cross sectional views of two kinds of radiographic image conversion panels applicable to the method of the invention.

DETAILED DESCRIPTION OF THE INVENTION

According to our studies, it is apparent that the sources of laser beams serving as stimulative excitation rays emit not only the beams having the emission wavelength of those laser beams but also rays having other wavelengths. For example, the emission spectrum of an Ar+ laser beam having the emission wavelength of 514.5 nm is as shown in FIG. 1 from which it can be seen that the Ar+ laser emits the rays having an intensity of the order of 1/100 to 1/1000 of the fluorescence intensity of 514.5 nm extending over a considerably wide range. It has also been definitely shown that this fact is a cause of noise troubles.

Figure 2A:
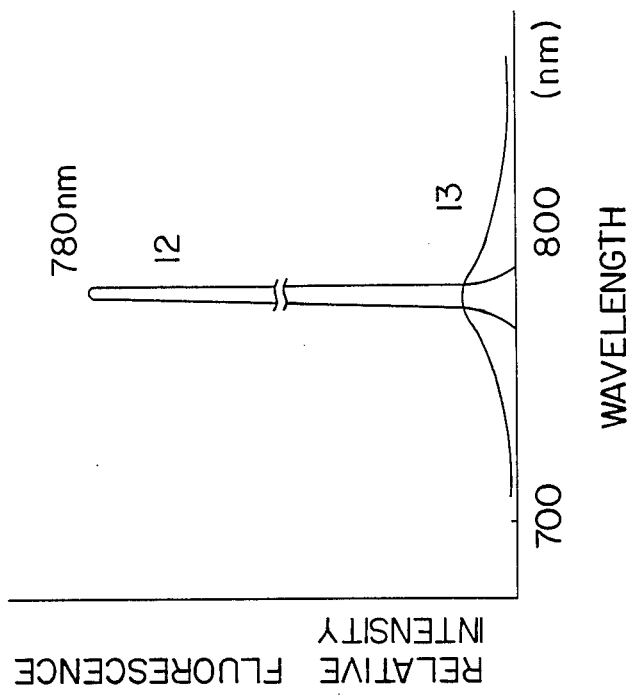
FIGS. 2(a) and 2(b) are graphs showing the emission spectrum of a semiconductor laser beam having an emission wavelength of 780 nm usable for a stimulative excitation ray.
Figure 2B:
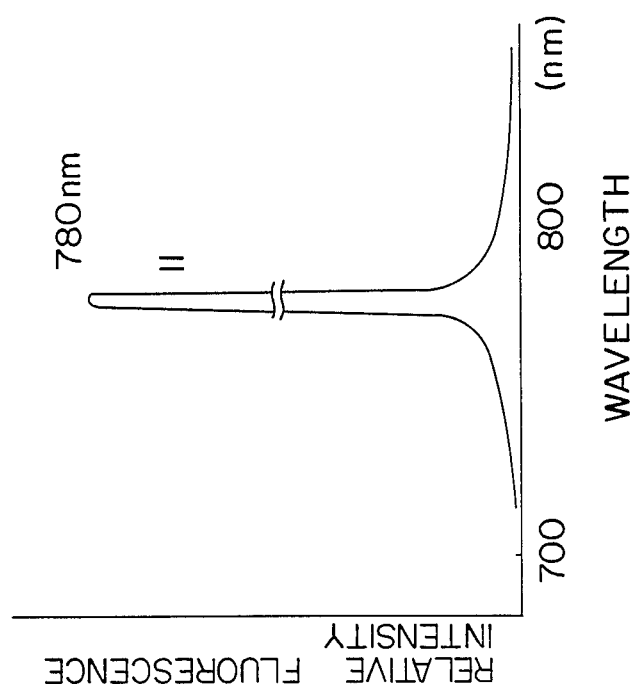

Further, a semiconductor source for the laser beam emits, not only the ray with the desired emission wavelength, but also rays on a LED level (similar to the luminescence from the light-emission diode). In the case wherein a semiconductor with an emission wavelength of from about 650 nm to 1000 nm is used, the emission spectrum distribution of such a laser having an emission wavelength of, for example, 780 nm, shows the form indicated as 11 in FIG. 2(a). The spectrum distribution caused by emission as shown at 12 in FIG. 2(b) and the spectrum distribution caused by luminescence other than emission as shown by 13 overlap each other. The luminescence as shown by 13 is identical to that of an LED and it is observed in every semiconductor laser. It is expressed as the luminescence on an LED level in the present specification. While the semiconductor laser is being caused to emit a ray of less than 20 mW, the luminescence on a LED level was observed and there was shown a distribution wherein a peak width at half height extended over 50 nm or more, although the center value was nearly the same as the emission wavelength and the output thereof was 0.2 mW which was as high as 1% of the total output. The portion of the luminescence on an LED level overlapping the wavelength distribution of the stimulative fluorescence, namely, the ray of LED level luminescence corresponding to the zone of the wavelength of stimulative fluorescence, passed through the intercepting means and was led directly to the detector as a stimulative fluorescence, thus causing the noise.

For the correct reading of a radiographic image recorded on the radiographic image conversion panel without fail, it is, therefore, required to eliminate rays of light having any other wavelengths than the emission wavelength of laser beams to be used as stimulative excitation rays.

In this invention, a spectroscope, a filter or the like is used for an optical means for eliminating the rays of light having any other wavelengths than the emission wavelength of the laser beams. Such spectroscopes include, for example, those using an interferometer, as well as those using a prism or a diffraction grating; and such filters include, for example, an interference filter and the like, as well as those made of a gelatin film tinted with a dye, a colored or special glass plate, and those each containing a dye-solution in the glass-mode container thereof.

The optical means relating to this invention shall not, however, be limited to the above-mentioned means, but may also be any means provided that it can be used for taking out solely the rays of light in a specific wavelength region. It is preferred to use a filter from the viewpoints of the ease and economy in use.

The optical means may also be used individually or in combination; it is further advantageous to use them in conjunction with such an element for restricting the optical path such as a slit, pin-hole or the like.

The above-mentioned optical means may be provided between the laser beams and the radiographic image conversion panel, and is preferably located adjacent the source of the laser beams. Further, a filter or the like can be used so that stray light such as that reflected from the panel or the like may be prevented from mixing into a photodetector.

In this invention, a stimulative phosphor material is defined as such a phosphor material that re-emits rays of light corresponding to the exposure of the initial light or the initial high-energy radiation rays upon being stimulated optically, thermally, mechanically, chemically, electrically, etc. after exposure to the initial light or the initial high-energy radiation. The rays of light mentioned herein include electromagnetic radiation such as visible rays, ultraviolet rays and infrared rays; and the high-energy radiation rays include X-rays, gamma rays, beta rays, alpha rays, neutron rays and the like.

The stimulative phosphor materials to be used in the invention include, for example, those each emitting a stimulative fluorescence when irradiated with stimulative excitation rays after irradiated with radiation rays thereto, as aforementioned, and more preferably from the substantial aspects, those each emitting stimulative fluorescence when irradiated with excitation rays of more than 500 nm. The stimulative phosphor materials to be used in the radiographic image conversion panels of the invention include, for example, phosphor materials represented by $BaSO_4:Ax$, in which A represents at least one of Dy, Tb and Tm, and x is $0.001 \leq x \leq 1$ mole %, as described in Japanese Patent O.P.I. Publication No. 80487/1973; phosphor materials represented by $MgSO_4:Ax$, in which A is at least one of Ho and Dy, and x is $0.001 \leq x \leq 1$ mole %, as described in Japanese Patent O.P.I. Publication No. 80488/1973; phosphor materials represented by $SrSO_4:Ax$, in which A is at least one of Tm, Tb, and Dy, and x is $0.001 \leq x \leq 1$ mole %, as described in Japanese Patent O.P.I. Publication No. 80489/1973; phosphor materials of $NaSO_4$, $CaSO_4$, $BaSO_4$ or the like having at least one of Mn, Dy and Tb added thereto, as described in Japanese Patent O.P.I. Publication No. 29889/1976; phosphor materials of BeO, LiF, $Mg_2SO_4$, $CaF_2$ or the like as described in Japanese Patent O.P.I. Publication No. 30487/1977; phosphor materials of $Li_2B_4O_7:CuAg$ or the like as described in Japanese Patent O.P.I. Publication No. 39277/1978; phosphor materials of the formula $Li_2O(B_2O_2)x:Cu$ wherein x is $2<x \leq 3$; $Li_2O(B_2O_2)x:Cu, Ag$ in which x is $2<x \leq 3$, or the like; phosphor materials represented by SrS:Ce,Sm, SrS:Eu,Sm, $La_2O_2S$:Eu,Sm, or (Zn, Cd)S:Mn,X in which X is a halogen, as described in U.S. Pat. No. 3,859,527; phosphor materials represented by ZnS:Cu, Pb as described in Japanese Patent O.P.I. Publication No. 12142/1980; barium aluminate phosphor materials of the formula $BaOxAl_2O_2$:Eu in which x is $0.8 \leq x \leq 10$; alkaline earth metal silicate phosphor materials of the formula $M^{II}OxSiO_2:A$, in which $M^{II}$ represents Mg, Ca, Sr, Zn, Cd or Ba, A is at least one of Ce, Tb, Eu, Tm, Pb, Tl, Bi, and Mn, and x is $0.5 \leq x \leq 2.5$; alkaline earth metal phosphor materials of the formula $(Ba_{1-x-y}Mg_xCa_y)FX:eEu^{2+}$ in which X is at least one of Br and Cl, x, y and e are numerical values satisfying the conditions of $0<x+y \leq 0.6$, $xy=0$ and $10^{-5} \leq e \leq 5 \times 10^{-2}$ respectively, as described in Japanese Patent O.P.I. Publication No. 12143/1980; phosphor materials of the formula LnOX:xA in which Ln is at least one of La, Y, Gd and Lu, X is Cl and/or Br, A is Ce and/or Tb, and x is a number satisfying the relation $0<x<0.1$, as described in Japanese Patent O.P.I. Publication No. 12144/1980; phosphor materials of the formula $(Ba_{1-x}M^{II}_x)FX:yA$ in which $M^{II}$ is at least one of Mg, Ca, Sr, Zn and Cd, X is at least one of Cl, Br, and I, A is at least one of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively, as described in Japanese Patent O.P.I. Publication No. 12145/1980; phosphor materials of the formula BaFX:xCe, yA in which X is at least one of Cl, Br and I, A is at least one of In, Tl, Gd, Sm and Zn, x and y are $0 < x \leq 2 \times 10^{-1}$ and $0 < y \leq 5 \times 10^{-2}$, respectively, as described in Japanese Patent O.P.I. Publication No. 84389/1980; rare earth element activated divalent metal phosphor materials of the formula $M^{II}FXxA:yLn$ in which $M^{II}$ is at least one of Ba, Ca, Sr. Mg, Zn, and Cd, A is at least one of BeO, MgO, CaO, SrO, BaO, ZnO, $Al_2O_3$, $Y_2O_3$, $La_2O_3$, $In_2O_3$, SiO, $TiO_2$, $ZrO_2$, $GeO_2$, $SnO_2$, $Nb_2O_3$, $Ta_2O_3$ and $ThO_2$, Ln is at least one of Eu, Tb, Ce, Tm, Dy, Pr, Ho, Nd, Yb, Er, Sm and Gd, X is at least one of Cl, Br and I, and x and y are numbers satisfying the conditions of $5 \times 10^{-5} \leq x \leq 0.5$ and $0 < y \leq 0.2$, respectively, as described in Japanese Patent O.P.I. Publication No. 160078/1980; phosphor materials of the formulas ZnS:A, CdS:A, (Zn,Cd)S:A, ZnS:A,X and CdS:A,X in which A is Cu, Ag, Au or Mn, and X is a halogen; phosphor materials having the following Formula [I] or [II]:

$$xM_3(PO_4)_2NX_2:yA \qquad \text{Formula [I]}$$

$$M_3(PO_4)_2:yA \qquad \text{Formula [II]}$$

in which M and N are at least one of Mg, Ca, Sr, Ba, Zn and Cd, respectively, X is at least one of F, Cl, Br and I, A is at least one of Eu, Tb, Ce, Tm, Dy, Pr, Ho, Nd, Yb, Er, Sb, Tl, Mn and Sn, and x and y are the numeral values satisfying the conditions of $0 < x \leq 6$ and $0 \leq y \leq 1$, respectively, as described in Japanese Patent O.P.I. Publication No. 38278/1984; a phosphor material having the following formula [III] or [IV];

$$nReX_3mAX'_2:xEu \qquad \text{Formula [III]}$$

$$nReX_3mAX'_2:xEu,ySm \qquad \text{Formula [IV]}$$

wherein, Re is at least one of La, Gd, Y and Lu, A is at least one of an alkaline earth metal, Ba, Sr and Ca, X and X' are at least one of F, Cl and Br, respectively, x and y are numbers satisfying the conditions of $1 \times 10^{-4} < x < 3 \times 10^{-1}$ and $1 \times 10^{-4} < y < 1 \times 10^{-1}$, respectively, and n and m satisfy the conditions of $1 \times 10^{-3} < n$ or $m < 7 \times 10^{-1}$, respectively; and alkalihalide phosphors represented by the following general formula $$M^IX.am^{II}X'_2.bM^{III}X''_3:cA$$

wherein $M^I$ is at least one alkali metal selected from Li, Na, K, Rb and Cs; $M^{II}$ is at least one divalent metal selected from Be, Mg, Ca, Sr, Ba, Zn, Cd, Cu and Ni; $M^{III}$ is at least one trivalent metal selected from Sc, Y, La, Ce, Pr, Nd, Pm, Sm, Eu, Gd, Tb, Dy, Ho, Er, Tm, Yb, Lu, Al, Ga and In; X, X' and X" are at least one halogen selected from F, Cl, Br, and I; A is at least one metal selected from Eu, Tb, Ce, Tm, Dy, Pr, Ho, Nd, Yb, Er, Gd, Lu, Sm, Y, Tl, Na, Ag, Cu and Mg; a is from 0 to 0.5; b is from 0 to 0.5; and c is from 0 to 0.2; and the like.

The phosphor materials used in the radiographic image conversion processes relating to the invention shall not be limited to the above exemplified ones but it is needless to say that any kinds of phosphor materials may be used provided that they can emit a stimulative fluorescence.

Now, referring to a radiographic image conversion panel to be used in a radiographic image reading system of this invention, and to a laser beam source with which a stored image is irradiated in the form of a stimulative fluorescence, FIG. 4 illustrates the examples of the radiographic image conversion panels. In FIG. 4(a), radiographic image conversion panel 30 comprises support 31 and stimulative phosphor material layer 32 coated on one side of the support 31.

For the supports, a polyethylene sheet, a plastic film and an aluminium plate each of from 50 to 300 μm in thickness, and a glass plate of from 1 to 3 mm in thickness are popularly used. Further, support 31 may be either transparent or opaque. When using an opaque support, a stimulative fluorescence is detected from the reverse side of the support. Besides, as illustrated in FIG. 4(b), it is also useful to provide protective layer 33 for a stimulative phosphor material layer surface opposite to the support. It is further advantageous to rim the edges of the panel used in the invention with tapes of the order of from 0.01 to 1 mm in thickness. Various types of panels including, for example, not only a panel type but a long, flexible sheet type, may be used for the purposes of this invention.

The laser beams capable of serving as the stimulative excitation rays to be used in the invention include, for example, $Ar^+$ laser, YAG laser, He-Cd laser, He-Ne laser, Kr laser, dye laser, semiconductor laser and the like. $Ar^+$ laser, He-Ne laser, Kr laser, and semiconductor laser may preferably be used in the invention. Most preferable is the semiconductor laser. The range of preferable emission wavelengths is about 500 nm to 1000 nm.

The embodiments of the invention will now be described in detail with reference to the accompanying drawings.

In FIG. 3, reference numeral 21 is a radiation producing apparatus, 23 is a radiographic image conversion panel having a stimulative phosphor material layer thereon, 24 is a laser beam source for emitting a radiographic latent image in the form of stimulative fluorescence from the radiographic image conversion panel, 25 is a photodetector for detecting the stimulative fluorescence emitted from the radiographic image conversion panel, 26 is a device for reproducing an image according to photoelectric conversion signals detected by photodetector 25, 27 is a device for displaying the reproduced image, 28 is a filter for separating stimulative excitation rays and the stimulative fluorescence from each other so as to transmit only the stimulative fluorescence, and 29 is an optical means relating to the invention. 25, 26 and 27 each shall not be limited to those mentioned above, but they may be of any types provided that the optical information given from 23 can be reproduced in any way into the images thereof.

As illustrated in FIG. 3, when subject 22 is positioned between radiation producing apparatus 21 and radiographic image conversion panel 23 and radiation rays are radiated to the subject, the radiation rays penetrate the subject according to the radiation penetration of each part of the subject, and the penetrated image (i.e., the image formed according to various intensity of the radiation rays) falls on radiographic image conversion panel 23. The penetrated image incident thereon is absorbed in the stimulative phosphor material layer of radiographic image conversion panel 23, and a number of electrons and/or holes is produced in proportion to the dose absorbed in the stimulative fluorescent material layer. The electrons and/or holes are then stored in the trap-level of the stimulaive phosphor material. In other words, a storage image (i.e., a latent image) of the radiation penetration image is formed.

Next, the electrons and/or holes stored in the trap-level of the stimulative phosphor material layer of radiographic image conversion panel 23 are excited by the rays of light having only the emission wavelength of the laser beam which have an emission wavelength in the region of the stimulative excitation wavelengths of the stimulative phosphor material used in radiographic image conversion panel 23, so that the stored image is emitted in the form of stimulative fluorescence. The intensity of the emitted stimulative fluorescence is in proportion to the intensity of the radiant energy absorbed in the stimulative phosphor material layer of radiographic image conversion panel 23. The stimulative fluorescence is separated from laser beams by a filter, and is, for example, converted into electric signals by photodetector 25, e.g. a photomultiplier tube. After reading the radiographic image, the output of the photodetector is amplified and filtered, and the image is then processed, if necessary. After processing the image, the electric signals are sent to an image reproduction means such as a CRT and the radiographic image is displayed on an image display means.

Next, the invention will be described in greater detail with reference to the following embodiments thereof:

EXAMPLE 1

The dispersion of eight parts by weight of fluorescent material comprising $BaFBr:Eu^{2+}$ was carried out with a solvent prepared by mixing equal parts of acetone and ethyl acetate in one part by weight of polyvinyl butylal as a binder, and the dispersion solution was coated on a polyethylene terephthalate support by the use of a wire-bar, so that a panel was prepared.

The dry thickness of the phosphor material layer of this panel was about 300 μm. After irradiating the panel at a distance of 100 cm from the focal point of an X-ray tube with X-rays of 80 KVP tube voltage and 100 mA tube amperage for 0.1 sec., only the stimulative fluorescence emitted from the phosphor material layer was detected with the apparatus illustrated in FIG. 3. In such apparatus, $Ar^+$ laser beams having the laser power of 10 mw were used and a filter, as shown in Table 1, was provided immediately behind the laser beam source so as to serve as the optical means relating to the invention, and a filter indicated by 28 in FIG. 3 was used so as to cut off the laser beams. Making use of the same arrangement, a light-diffusion plate in place of the above-mentioned panel was irradiated with $Ar^+$ laser beams and the diffused light therefrom was detected, so that the intensity of the diffused light was measured. The diffused light detected in this case was noise, because it was not a stimulative fluorescence.

As a result, the ratio of the intensity of the stimulative fluorescence to the intensity of the $Ar^+$ laser beams, i.e., the S/N ratio, was as shown in Table 1.

TABLE 1

| No. | Filter | S/N ratio |
| --- | --- | --- |
| 1 | Y-49 (Mfd. by Toshiba Glass Co.) | $2.1 \times 10^4$ |
| 2 | CS4-96 (Mfd. by U.S. Corning Co.) | $2.7 \times 10^4$ |

TABLE 1-continued

| No. | Filter | S/N ratio |
| --- | --- | --- |
| 3 | Y-49 + CS4-96 | $6.4 \times 10^5$ |
| 4 | BG-18 (Mfd. by U.S. Spectro-Film Inc. Co.) + GG495 (Mfd. by U.S. Spectro-Film Inc. Co.) | $6.0 \times 10^5$ |
| 5 | DI-515 (Mfd. by U.S. Corion Co.) | $6.7 \times 10^5$ |

COMPARATIVE EXAMPLE 1

The S/N ratio of this example was measured under the very same conditions as those in Example 1 except that the optical means relating to the invention was not used. The result thereof was $3.3 \times 10^2$.

As are obvious from the above Table 1 and Comparative Example 1, it is found that the S/N ratio was improved by making use of a filter to serve as an optical means of the invention and therefore radiographic image reading method causing less noise can be provided.

EXAMPLE 2

The S/N ratio of this example was measured under the very same conditions as those in Example 1 except that a prism made of fused transparent quartz (mfd. by Melles Griot Co.) was used for the optical means relating to the invention. The S/N ratio thereof was $3.5 \times 10^4$. It was found that the S/N ratio was improved by making use of a prism, as compared with Comparative Example 1.

EXAMPLE 3

The S/N ratio of this example was measured under the very same conditions as those in Example 1 except that a Monochrometer G-250 (mfd. by Nippon Kogaku Co.) using a diffraction grating replaced the filter of Example 1. The S/N ratio resulted was $5.8 \times 10^5$. It was found, as compared with Comparative Example 1, that the S/N ratio was improved by making use of the diffraction grating for the optical means of the invention and therefore that a radiographic image having less noise can be read.

EXAMPLE 4

After irradiating the panel prepared in the same manner as in Example 1 at the distance of 150 cm from the focal point of an X-ray tube with X-rays of 90 KVP tube voltage and 150 mA tube amperage for 0.1 sec., the stimulative fluorescence emitted from the panel was detected with the apparatus illustrated in FIG. 3 in which He-Ne laser beams having the laser power of 10 mw were used and a filter, DI-633 mfd. by Collion Co., was provided immediately behind the laser beam source so as to serve as an optical means relating to the invention, whereby the stimulative fluorescence emitted from the panel was detected. The S/N ratio thereof was measured under the above-mentioned conditions and in the same manner as in Example 1. The S/N ratio resulted was $6.1 \times 10^5$.

COMPARATIVE EXAMPLE 2

The S/N ratio of this example was measured under the very same conditions as in Example 4 except that the filter used in Example 4 was removed. The S/N ratio measured was $3.5 \times 10^2$.

EXAMPLE 5

A phosphor consisting of RbBr:Tl was deposited on an aluminum substrate to prepare a phosphor panel. The thickness of the phosphor layer formed was about 300 μm. The panel was placed about 100 cm away from the focal point of the X-ray tube and, after exposure for 0.1 sec to the X-ray based on 80 KVP of tube voltage and 100 mA of tube current, the wavelength zone of the stimulative fluorescence emitted from the phosphor layer only was detected by using the semiconductor laser beam with an emission wavelength of 838 nm as an excitation light source of the apparatus shown in FIG. 3. This was done by arranging filter 29 as an optical means relating to the present invention right behind the source for laser beam and by using the filter to cut off the excitation ray 28 in FIG. 3.

Next, after replacing the panel with a light-diffusing plate only, the ray within the same wavelength zone only was detected. Since the ray detected in this case is not a stimulative fluorescence, it corresponds to the noise. Therefore, the value of the ratio of the signal detected from the plate to the signal detected from the diffusing plate indicates the S/N ratio. S/N ratios thus obtained are shown in No. 1 of Table 2, and Table 3 shows the experimental conditions for the above S/N ratios.

TABLE 2

| No. | filter related to the present invention | SNR present invention | SNR conventional |
|---|---|---|---|
| 1 | RG-780 (made by Spectro-Film Inc. in the U.S.A.) | $6.4 \times 10^5$ | $1.2 \times 10^2$ |
| 2 | RG-9 (made by Spectro-Film Inc. in the U.S.A.) | $2.3 \times 10^5$ | $1.1 \times 10^2$ |
| 3 | RG-715 (made by Spectro-Film Inc. in the U.S.A.) | $1.0 \times 10^5$ | $7.8 \times 10^1$ |
| 4 | RG-9 (made by Spectro-Film Inc. in the U.S.A.) | $1.5 \times 10^6$ | $1.5 \times 10^2$ |
| 5 | RG-715 (made by Spectro-Film Inc. in the U.S.A.) | $8.4 \times 10^5$ | $9.8 \times 10^1$ |

TABLE 3

| conditions | emission wavelength (nm) of LD | tube voltage KVP | tube current mA | distance cm | time sec |
|---|---|---|---|---|---|
| 1 | 838 (Matsushita) | 80 | 100 | 120 | 0.1 |
| 2 | 838 (Matsushita) | 90 | 100 | 150 | 0.1 |
| 3 | 838 (Matsushita) | 80 | 80 | 150 | 0.1 |
| 4 | 788 (Hitachi) | 80 | 90 | 120 | 0.2 |
| 5 | 788 (Hitachi) | 80 | 100 | 150 | 0.1 |

SNR values in the column of "conventional" are the ones obtained under the same conditions as the ones in the column of "present invention" except that the means related to the present invention (the filter shown in Table 2, in this case) was removed. It is apparent that the present invention has a greatly improved S/N ratio and reduced noise.

Experiments similar to the above example were performed with values of tube voltage, tube current, exposure time and subject distance as shown in No. 2 of Table 3. As a filter, the color filter RG-9 (made by Spectro-Film Inc. in the U.S.A.) was used and the S/N ratio was also improved as shown in No. 2 of Table 2. The third example also indicated the same advantage.

In Nos. 4 and 5, the semiconductor laser with an emission wavelength of 788 nm was used and the improvement in an S/N ratio was observed in the same way as in the Nos. 1–3.

Incidentally, the short-wavelength-cutting filter is used as a means of the invention in the present example, and it gives the effect of a band-pass filter when it is combined with the long-wavelength-cutting filter that is used as a means for separating the stimulated luminescence from the excitation light. In the present example, therefore, the purpose may be fully attained with a short-wavelength-cutting filter. Incidentally, even when the band-pass filter itself is used, an advantage of the present invention may be obtained but, when the long wavelength-cutting filter is used in combination with the short-wavelength-cutting filter, it is possible to filter with a degree of freedom and a transmission factor which are greater than those for the band-pass filter.

As is obvious from the above examples, when the optical means related to the present invention is used, the S/N ratio is improved and radiographic images with less noise are produced.

In the present examples, the values of 838 nm and 788 nm are given as the wavelengths of the semiconductor laser beams, but the present invention is not limited to the above values. Even when a semiconductor laser whose emission wavelength is shorter or longer than the exemplified value is used, it is possible to obtain a better S/N ratio if the means for controlling the luminescence on an LED level is provided.

As is obvious from Example 4 and Comparative Example 2, the S/N ratio was improved by making use of the optical means of the invention and therefore a method of reading a radiographic image having less noise can be provided.

What we claim is:

1. A method of reading out a radiographic image which comprises
    a. storing radiation energy corresponding to a radiographic image on a stimulable phosphor layer on a panel,
    b. scanning said layer with a semi-conductor laser to release said energy as fluorescence, and
    c. detecting said fluorescence to form an image, wherein all wavelengths having an intensity lower than an emission peak intensity of said laser are removed by optical means before scanning said layer.

2. The method according to claim 1, wherein said optical means is selected from the group consisting of prisms, diffraction gratings, interferometers and filters.

3. The method according to claim 2, wherein said optical means is a filter.

4. The method according to claim 1, wherein said semi-conductor layer's wavelength is in the range of from 500 nm to 1000 nm.

5. The method according to claim 1, wherein said method includes using a filter for dividing said fluorescence from said semi-conductor laser and letting only said fluorescence pass before detecting said fluorescence by a detector.

6. The method according to claim 1 wherein said wavelength of semiconductor laser is in the range of from 650–1000 nm.

7. The method according to claim 1 wherein said semiconductor laser has a single emission peak.

* * * * *